June 15, 1937.  G. N. EDWARDS  2,084,019
RUNNING BOARD
Filed Jan. 25, 1935
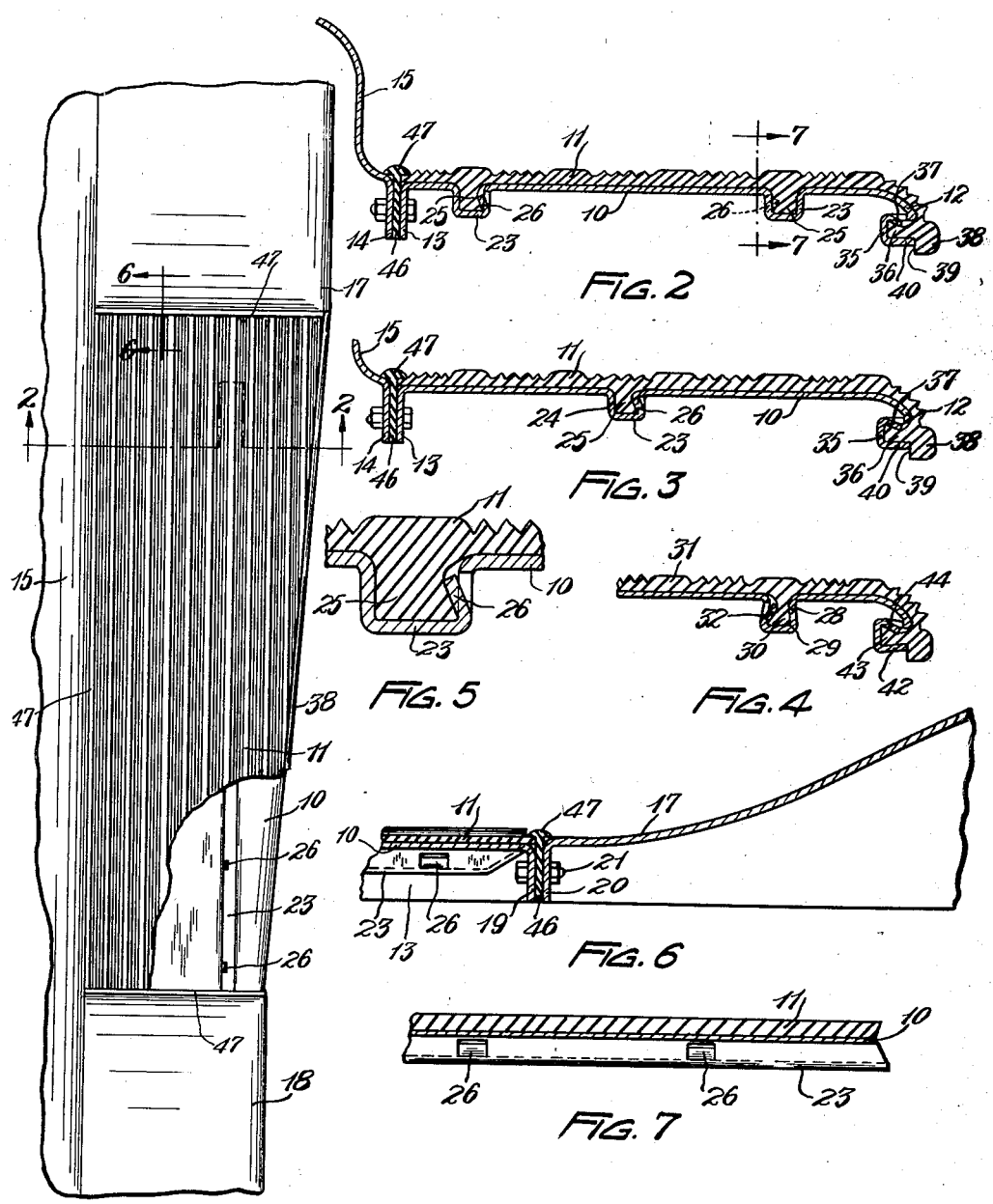
INVENTOR.
GEORGE N. EDWARDS
BY
Kwis Hudson & Kent
ATTORNEYS Patented June 15, 1937

2,084,019

UNITED STATES PATENT OFFICE 2,084,019

RUNNING BOARD

George N. Edwards, Willoughby, Ohio, assignor to The Ohio Rubber Company, Willoughby, Ohio, a corporation of Ohio Application January 25, 1935, Serial No. 3,451

6 Claims. (Cl. 280—163)

This invention relates to vehicle running boards, and more particularly to an improved form of composite steel and rubber running board.

An object of this invention is to provide an improved vehicle running board having a metal body and a rubber tread or cover, and wherein novel means is provided for connecting the cover with the metal body.

Another object of this invention is to provide an improved running board structure, of the type just mentioned, wherein the metal body has one or more hollow ribs thereon providing one or more grooves opening toward the top of the metal body and wherein the rubber cover has portions thereof retained in such grooves.

A further object of this invention is to provide an improved running board structure having a grooved metal body and a rubber cover with a portion thereof extending into the groove or grooves of the metal body, and wherein lugs are struck from the wall of the groove and deflected inwardly thereof to press against the portion of the rubber covering extending thereinto.

Still another object of the invention is to provide a novel running board structure, wherein the rubber cover and the metal body have cooperating portions providing a dovetail connection therebetween.

It is also an object of this invention to provide an improved running board cover formed of extruded rubber and having ribs on the underside thereof.

Yet another object of this invention is to provide a novel form of running board packing strip having a stem portion adapted to extend between the running board and vehicle structure and a top part adapted to form a cover for the joint.

The invention may be further briefly summarized as consisting in certain novel combinations and arrangements of parts hereinafter described and more particularly set out in the appended claims.

In the accompanying sheet of drawings,

Fig. 1 is a plan view showing a vehicle running board constructed according to my invention, portions of the rubber cover of the running board being broken away;

Fig. 2 is a transverse sectional view taken through the running board and adjacent vehicle structure, as indicated by line 2—2 of Fig. 1;

Fig. 3 is a similar transverse sectional view taken through another running board embodying my invention;

Fig. 4 is a partial transverse sectional view of still another running board constructed according to my invention;

Fig. 5 is a partial sectional view taken transversely of one of the hollow ribs of the metal body and illustrating the structure at this point on a somewhat larger scale;

Fig. 6 is a partial longitudinal sectional view taken through the running board and adjacent vehicle structure, as indicated by line 6—6 of Fig. 1; and Fig. 7 is a partial longitudinal sectional view taken through the running board adjacent one of the hollow ribs thereof, as indicated by line 7—7 of Fig. 2.

In the accompanying drawing to which more detailed reference will now be made, I have shown what I now regard to be preferred forms of my improved composite steel and rubber vehicle running board. It should be understood, however, that the drawing is illustrative only and that the invention may be embodied in various other types and forms of running boards and the like.

As represented in the drawing, the form of vehicle running board to which my invention is especially applicable comprises a metal body 10, and a soft rubber cover or tread 11 mounted upon and extending over the top of the metal body.

The metal body may be formed of sheet steel by suitable stamping or drawing operations, and as shown in the drawing, may be elongated and generally rectangular in shape. The metal body may have a downwardly extending flange 12 along the front or outer edge of the running board, and may have a depending flange 13 at the inner or rear edge of the running board for connection with the flange 14 of the splash pan or dust guard 15 of the vehicle. The ends of the running board may be connected, respectively, to the front and rear fenders 17 and 18, and for this purpose the metal body may be provided with downturned end flanges 19 adapted to be clamped to corresponding downturned flanges 20 of the fenders by means of the clamping bolts 21.

The rubber cover or tread 11 comprises a sheet of soft rubber which extends over substantially the entire upper surface of the sheet metal body 10. While this cover is referred to herein as being formed of rubber, other materials originally plastic in state, may be used provided they have the desired flexibility, appearance and wearing qualities and otherwise answer the necessary requirements. Soft rubber, however, produces the best results and at the present time is preferred.

The soft rubber cover 11 may, if desired, be preformed and subsequently attached to the metal running board body 10. This cover may be preformed by molding and vulcanizing the uncured rubber between cooperating mold members of a vulcanizing press, or it may be formed as an extruded sheet or strip which is subsequently cut to conform in size and outline to the metal running board body. In forming the rubber cover either by molding or extruding, it is preferably provided with a pattern or configuration on the top surface thereof such as the ribbed pattern shown in this instance. When the rubber cover is preformed as by the molding or extruding operations just mentioned, it is subsequently attached to the metal body by mechanical fastening means which forms a feature of my invention presently to be described. If desired, this mechanical fastening means may be supplemented by a suitable cement or other adhesive.

It is not necessary to my invention that the soft rubber cover be preformed and subsequently attached to the metal body, but if desired, may be molded and vulcanized directly in contact with the metal body and thereby connected to the latter. When the rubber cover is thus molded and vulcanized in contact with the metal body, the top surface of the cover may be given a desired pattern or configuration as mentioned above, and the connection formed between the rubber and the metal during the vulcanizing operation may be supplemented by my novel mechanical fastening means which is now to be described.

As an important feature of my invention I construct the metal body 10 with one or more hollow ribs 23, which may be formed by stamping or drawing downwardly certain portions of the metal body, as shown in Fig. 2 of the drawing. These hollow ribs preferably extend longitudinally of the metal body and serve to reenforce and stiffen the same, as well as to constitute a part of my mechanical fastening means for the rubber cover. The hollow ribs provide channel-like recesses which open toward, and are accessible from, the top of the metal body and into which portions of the rubber cover extend. The portions of the rubber cover which extend into the channel-like recesses or grooves of the hollow ribs are preferably formed as integral tongue-like projections or ribs 25 on the underside of the cover and which are of a cross-sectional shape to substantially fill the recesses.

To establish a connection between the projections or tongues 25 of the rubber cover and the hollow ribs 23 of the metal body, I provide one or both of the side walls of the hollow rib with lugs 26 which are struck or partially sheared from the metal of the wall and deflected into the recess of the rib to press against the tongue of the rubber covering extending thereinto. It will be noted from the drawing, particularly Fig. 5, that the lugs 26 are formed so that the lower portion thereof remains connected to the metal of the hollow rib, while the upper portion thereof is adapted to be swung or deflected inwardly and downwardly of the rib recess. When the lugs are deflected into engagement with the tongue 25 of the rubber cover in this way, they press laterally and downwardly against the tongue, as indicated in Fig. 5, and tend to draw or hold the tongue downwardly in the recess, which causes the rubber cover 11 to be drawn or held down against the surface of the metal body 10. The lugs 26 may be provided in suitable number by being spaced longitudinally along the side walls of the hollow ribs, as shown in Fig. 7, and may be deflected or bent into the rib recess for engagement with the rubber tongue 25 by any suitable deflecting tool or operation.

It may be desirable to further increase the strength of the connection between the tongues 25 of the rubber cover and the hollow ribs of the metal body, and this may be done by shaping the rib recess and the rubber tongue so as to provide a dove-tail connection therebetween, as illustrated in Fig. 4. When such a dove-tail connection is desired, the side walls 28 of the hollow rib 29 are inclined toward each other, so that the rib recess is wider at the bottom than it is at the top. The integral rib or tongue 30 of the rubber cover 31 is of corresponding cross-sectional shape and when disposed in the hollow rib 29 the dovetail connection thereby formed tends to prevent withdrawal of the tongue from the rib recess. In addition to the locking cooperation effected by the dovetail connection between the tongue of the rubber cover and the hollow rib of the metal body, I may provide the latter with spaced lugs 32, which are similar to the lugs 26 of Figs. 2 and 5 as to construction and purpose.

The hollow ribs may be provided in any suitable number on the metal body of the running board and, by way of illustration, I show, in Fig. 2, two of the hollow ribs 23 formed in the top part of the metal body, and in Fig. 3 I show one such hollow rib 29 formed in the top part of the metal body. Either of these rib arrangements, or any other desired rib arrangement, may be used. It will be understood, of course, that ribs providing a dovetail connection between the metal body and the rubber cover, such as the hollow rib 29 shown in Fig. 4, may also be provided in suitable number and if desired may be arranged in the manner of the hollow ribs 23 of Figs. 2 and 3.

In addition to the hollow ribs already described and the connections for the rubber cover afforded thereby, it may be desirable to provide a similar connection between the rubber covering and the metal body along the front or outer edge of the running board. In Figs. 2 and 3 of the drawing I show the metal body 10 as having a hollow rib 35 formed thereon along the lower edge of the down-turned flange 12. This hollow rib stiffens the front edge of the running board body and also provides a locking recess or groove which opens toward the front of the running board, and into which an integral extension or locking tongue 36 of the rubber cover extends. One or both of the side walls of the hollow rib 35 may have lugs 37 struck therefrom similar to the lugs 26 of Figs. 2 and 5. Outwardly of the integral locking tongue 36, I may provide the rubber cover with a longitudinally extending thickened marginal bead 38 which gives the cover a neat and finished appearance. This bead is preferably constructed with a depending longitudinal edge having a shoulder or face 39 at the back thereof which abuts against or overlies the edge 40 of the lower wall of the hollow rib 35.

In Fig. 4 of the drawing I have shown the metal body of the running board as having a hollow rib 42 extending along the front thereof and into which a locking tongue 43 of the rubber cover 31 extends. The hollow rib 42 and the locking tongue 43 are similar to the corresponding parts in the running board in Fig. 2, except that they are shaped to provide a dove-tail connection. The hollow rib 42 may also have lugs 44 struck from the wall thereof and pressed against the tongue 43.

When the rubber cover of my improved running board is preformed and subsequently attached to the running board, it will be understood that the tongues or ribs on the underside of the preformed rubber cover are inserted into the hollow ribs of the metal body and that the locking lugs of the hollow ribs are subsequently deflected to press against, or bite into, the projecting portions of the rubber cover with which they cooperate. When the rubber cover is molded or vulcanized directly in contact with the metal body, it will be understood that the molding and vulcanizing operation causes rubber to flow or be forced into the recess of the hollow ribs, and that it is not until this operation has been performed that the lugs of the hollow ribs are deflected inwardly to press against the tongues of the rubber.

As another important feature of my invention I provide a novel form of packing strip for the connection between the metal body of the running board and the adjacent vehicle structure. This packing strip, as shown in the drawing, is of T-like cross-sectional shape, having a stem portion 46 and a top or cover portion 47. The stem portion 46 is adapted to be clamped between the flanges at the ends and rear edge of the running board and the vehicle structure adjacent thereto, as shown in Figs. 2 and 6, and the top part 47 is adapted to overlie and form a cover for the joint between the running board and adjacent vehicle structure, as also shown in Figs. 2 and 6. When the packing strip is used in this manner the top part 47 overlies a portion of the adjacent vehicle structure, and a portion thereof overlies the edge of the rubber cover as shown in Fig. 6. This improved packing strip effectively excludes moisture and dust from between the connected metal parts and also gives the running board the appearance of having a neat marginal bead.

This improved packing strip may be formed of rubber, metal or any other suitable material, and may be constructed in any suitable manner, such as by an extruding operation.

From the foregoing description and the accompanying drawing it will now be readily understood that I have provided an improved form of composite vehicle running board, wherein a rubber cover or tread is connected to a metal running board body by a novel mechanical fastening means. It will be understood further that I have provided a novel form of packing strip for use between the running board and adjacent vehicle structure, which improves the character of the joint obtained at that point and also contributes to the neat and finished appearance of the running board.

Having thus described my invention, I claim:

1. A running board comprising a metal running board body having laterally spaced longitudinally extending hollow ribs providing corresponding recesses accessible from the top of the metal body, and an extruded rubber cover for said body having spaced integral projecting tongues extending into said recesses, the side wall of said hollow ribs having portions thereof deflected into said recesses and into engagement with said projecting tongues.

2. A running board comprising a metal running board body having a hollow rib providing a corresponding recess, and an extruded rubber cover extending over the top of the body and having on the underside thereof a projecting tongue extending into said recess, said hollow rib having lugs struck from the side wall thereof and pressed against said tongue.

3. A running board comprising a metal running board body having a hollow rib providing a corresponding recess accessible from the top of the body, and a preformed rubber cover extending over the top of the body and having on the underside thereof a projecting tongue extending into said recess, said hollow rib having lugs struck from the side wall thereof and pressed against said tongue, the lugs being formed with the lower portion thereof connected with the metal of the rib and the upper portion shiftable into the recess to press inwardly and downwardly against said tongue.

4. In combination a metal running board body having a hollow rib extending along the front thereof and providing a recess opening toward the front of the body, and a rubber cover on said body having a portion thereof retained in said recess.

5. In combination a metal running board body flanged downwardly at the front and having at or adjacent such flanged portion a hollow rib providing a recess opening toward the front, and a rubber cover for said body having a tongue retained in said recess.

6. In combination a metal running board body flanged downwardly at the front and having at or adjacent such flanged portion a hollow rib providing a recess opening toward the front, and a rubber cover for said body having a tongue retained in said recess, said hollow rib having lugs struck from the wall thereof and engaging the tongue of said cover.

GEORGE N. EDWARDS.